United States Patent [19]
Itoh et al.

[11] 3,820,009
[45] June 25, 1974

[54] VOLTAGE REGULATING SYSTEM FOR VEHICLE GENERATORS

[75] Inventors: Katumi Itoh, Oobu; Kazumasa Mori, Chita; Katsutaro Iwaki, Chiryu, all of Japan

[73] Assignee: Nippondenso Co., Ltd., Kariya-shi, Aichi-ken, Japan

[22] Filed: Dec. 12, 1972

[21] Appl. No.: 314,455

[30] Foreign Application Priority Data
Dec. 18, 1971 Japan.............................. 46-102848
Feb. 8, 1972 Japan................................ 47-14207

[52] U.S. Cl....................... 322/28, 320/31, 320/39, 320/48, 320/64, 322/73, 322/99
[51] Int. Cl. ............................................... H02p 9/30
[58] Field of Search ............ 322/28, 99, 73; 320/48, 320/31, 39, 64

[56] References Cited
UNITED STATES PATENTS
3,491,285  1/1970  Nowakowski..................... 322/28 X
3,553,563  1/1971  Kawashima....................... 322/28 X
3,617,852  11/1071  Phoenix............................ 322/28 X
3,617,853  11/1971  Kawashima et al............... 322/28 X
3,629,689  12/1971  Riff..................................... 322/28

Primary Examiner—James D. Trammell
Attorney, Agent, or Firm—Cushman, Darby & Cushman

[57] ABSTRACT

A voltage regulating system for vehicle generators of the type in which a voltage across the terminals of a battery is detected to thereby effect on-off control of the field current of an alternator for charging the battery in accordance with the detected voltage. The voltage regulating system includes a voltage control circuit for detecting the terminal voltage of the battery to effect on-off control of the field current, the on-off control action of said voltage control circuit having a hysteresis characteristic, and an astable multivibrator circuit connected to said voltage control circuit, whereby the duration of flow of the field current is always limited to less than one oscillation period of said multivibrator circuit, thereby effectively preventing oscillation from being caused in said voltage control circuit.

4 Claims, 6 Drawing Figures

VOLTAGE REGULATING SYSTEM FOR VEHICLE GENERATORS

BACKGROUND OF THE INVENTION

1. Field of the Invention

The present invention relates to a voltage regulating system for vehicle generators which regulates the voltage of a battery installed in a vehicle, particularly in an automobile.

2. Description of the Prior Art

Voltage regulating systems for vehicle generators have been proposed in which the battery is charged by a DC voltage obtained from a output of an alternator and the terminal voltage of the battery is detected to thereby effect on-off control of the field current of the alternator in accordance with the detected voltage by means of a transistor circuit having a series circuit of a capacitor and a resistor provided in a feedback path or a transistor circuit having a hysteresis characteristic imparted by an emitter resistor, e.g. a Schmitt circuit.

A disadvantage of voltage regulating systems of this type is that owing to the limited range of hysteresis characteristics, the field current may oscillate and this oscillation phenomenon may cause noise to be induced in a radio receiver installed in the vehicle, or it may cause the transistors for providing field current to be switched between its conductive and nonconductive states more frequently with resultant abnormal heat dissipation in the transistors. Moreover, depending on the battery and load conditions, the duration of interruption of a field current is undesirably elongated with the result that the battery voltage shows small fluctuations in synchronism with the interruption of the field current causing a variation in the luminous intensity of vehicle lights which is so great as to cause a feeling of uneasiness on the part of a driver.

SUMMARY OF THE INVENTION

It is an object of the present invention to provide a voltage regulating system for vehicle generators, which comprises a voltage control circuit adapted to give a hysteresis effect to both a field current interruption detecting voltage and field current conduction detecting voltage, and an astable multivibrator circuit connected to the voltage control circuit, and in which the duration of flow of the field current is prevented from increasing by always limiting it to less than one oscillation period of the astable multivibrator circuit to thereby increase the hysteresis range and prevent oscillation from being caused in the voltage control circuit even if noise voltages enter into said interruption and conduction detecting voltages.

It is another object of the present invention to provide a voltage regulating system for vehicle generators, which comprises a voltage control circuit adapted to provide a hysteresis range for a field current interruption detecting voltage and a field current conduction detecting voltage for interrupting and conducting the field current of an alternator to thereby prevent oscillation from being caused in the voltage control circuit, and an astable multivibrator circuit connected to the voltage control circuit through a delay circuit to thereby prevent the duration of flow of the field current from increasing by limiting it to less than one oscillation period of the astable multivibrator circuit, whereby the hysteresis range is apparently extended by inserting a delay circuit between the astable multivibrator circuit and the voltage control circuit, thereby adjusting the hysteresis range to become greater and preventing oscillation from being caused in the voltage control circuit even when noise voltages are introduced into the field current interruption and conduction detecting voltages.

The system according to the present invention has a great advantage in that since the system comprises a voltage control circuit for effecting on-off control of the field current of an alternator by detecting a voltage across the terminals of a battery, with switching hysteresis provided in the voltage control circuit for preventing oscillation from being caused therein, and an astable multivibrator circuit connected to the voltage control circuit to thereby limit the duration of flow of the field current to less than one oscillation period of the astable multivibrator circuit, the switching hysteresis range can be increased to prevent oscillation from being caused in the field current and to thereby eliminate a cause of noise induction in communication equipment, such as a radio receiver, installed in the vehicle. Moreover, the duration of interruption of the field current can be prevented from being elongated undesirably to thereby prevent the fluctuation of the luminous intensity of vehicle lights which might otherwise cause a feeling of uneasiness on the part of a driver and at the same time the power efficiency of the alternator can be raised by the application of its output as a power supply for the field current.

Another great advantage of the system of the present invention is that, since the system comprises a voltage control circuit including a detecting transistor adapted to be turned on and off according to the detection of the battery terminal voltage, and field current transistors are connected to the detecting transistor to invert the phase of the detecting transistor, with the output of the field current transistors being fed back to the base of the detecting transistor through a feedback resistor to provide switching hysteresis and prevent the occurrence of an undesired oscillation, as compared with the case where the voltage control circuit is composed of a conventional Schmitt circuit having switching hysteresis, the circuit through which the field current flows has no load such as an emitter resistor in a Schmitt circuit, which permits a sufficient amount of field current to flow and improves the efficiency of this system.

A further great advantage of the system of the present invention is that, by virtue of the fact that the delay circuit is provided between the astable multivibrator circuit and the voltage control circuit so as to apparently extend the hysteresis range, the system has an improved ability to withstand noise voltages than in the case of employing merely a voltage control circuit having a hysteresis effect.

A still further advantage of the present system is that, since transistor circuits can be used to constitute the system, upon constructing the system with integrated circuits, it is easier to make the system more fail-proof and more compact in size than those systems which employ an ordinary oscillator circuit comprising electrical elements such as coils, etc. and an ordinary delay circuit comprising a capacitor.

DESCRIPTION OF THE PREFERRED EMBODIMENTS

Figure 1:
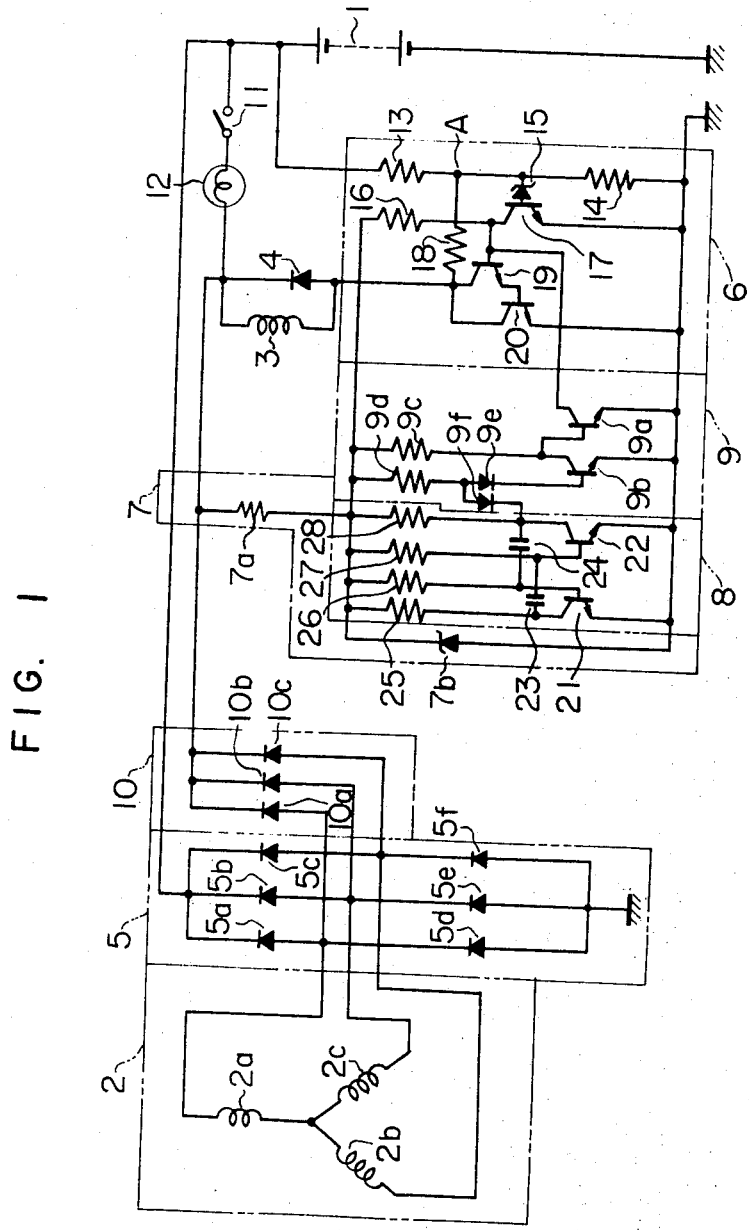
FIG. 1 is a wiring diagram of an embodiment of a voltage regulating system according to the present invention.

The present invention will now be explained with reference to the first embodiment shown in FIG. 1. In FIG. 1, numeral 1 designates a battery, 2 the armature of an alternator consisting of three armature coils $2a$, $2b$ and $2c$ connected in star. Numeral 3 designates the field winding of the alternator, 4 a diode for absorbing a counter electromotive force generated upon the interruption of field current, 5 a full-wave rectifier for the alternator consisting of six diodes $5a$, $5b$, $5c$, $5d$, $5e$ and $5f$. Numeral 6 designates a voltage control circuit, 7 a constant voltage circuit composed of a resistor $7a$ and a Zener diode $7b$. Numeral 8 designates an astable multivibrator circuit, 9 a reshaping circuit consisting of two transistors $9a$ and $9b$, two resistors $9c$ and $9d$ and two diodes $9e$ and $9f$. Numeral 10 designates a rectifier for field current consisting of three diodes $10a$, $10b$ and $10c$. Numeral 11 designates a power supply switch, 12 a charge warning light. The voltage control circuit 6 comprises two biasing resistors 13 and 14, a Zener diode 15, a collector resistor 16, a voltage detecting transistor 17, a feedback resistor 18 for providing a large switching hysteresis range, and field current transistors 19 and 20 connected to form a Darlington configuration with the field winding 3 alone constituting the load of the field current transistors 19 and 20. The astable multivibrator circuit 8 comprises two transistors 21 and 22, two capacitors 23 and 24 and four resistors 25, 26, 27 and 28.

With the construction described above, the operation of the system of the first embodiment will now be explained. The voltage control circuit 6 is a switching circuit having a sufficiently large hysteresis range to prevent the voltage control circuit 6 from oscillating and it is adapted such that the conduction of the voltage detecting transistor 17 renders the field current transistors 19 and 20 non-conductive, whereas when the voltage detecting transistor 17 is turned off, the field current transistors 19 and 20 are conducted thereby supplying a sufficient field current to the load circuit consisting of the field winding 3 only.

Now assume that $V_B$ denotes the terminal voltage of the battery 1, $R_{13}$, $R_{14}$ and $R_{15}$ denote the resistance values of the resistors 13, 14 and 15, $R_F$ denotes the winding resistance value of the field winding 3, $V_Z$ denotes the breakdown voltage of the Zener diode 15, $V_{BE}$ denotes the base-emitter voltage of the voltage detecting transistor 17, and $V_A$ denotes the potential at a point A. Then, with the field current transistors 19 and 20 retained in the conducting state by the nonconduction of the voltage detecting transistor 17, in order that the field current transistors 19 and 20 may be turned off, it is necessary that the potential $V_A$ at the point A exceeds the voltage level $(V_Z + V_{BE})$ at which the voltage detecting transistor 17 will be turned on. Namely, the value of a voltage $V_{B1}$ of the battery 1 for turning off the conducting field current transistors 19 and 20 is given by the following equation (1):

$$V_{B1} = [(R_{13} + R_{14} /\!/ R_{18})/(R_{14} /\!/ R_{18})] \cdot [(V_Z + V_{BE})] \quad (1)$$

On the other hand, the value of a voltage $V_{B2}$ of the battery 1 for turning on the nonconducting field current transistors 19 and 20 is given by the following equation (2):

$$V_{B2} = [(R_{14} + (R_F + R_{18}) /\!/ R_{13})/R_{14}] \cdot [(V_Z + V_{BE})] \quad (2)$$

Figure 2:
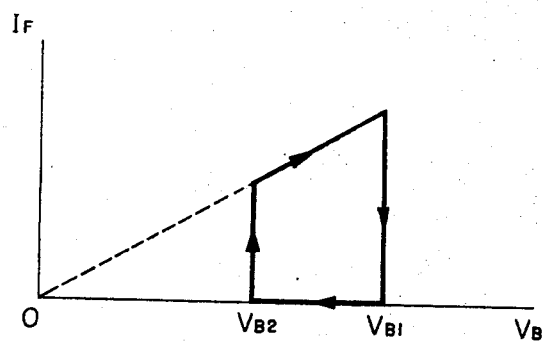
FIG. 2 is a characteristic diagram showing the switching hysteresis characteristic of the voltage control circuit of the system of the embodiment shown in FIG. 1.

The difference between the values of the voltages $V_{B1}$ and $V_{B2}$ obtained from the above equations represents the hysteresis range and this hysteresis range increases as the resistance value of the feedback resistor 18 decreases. FIG. 2 shows the behavior of the terminal voltage $V_B$ of the battery 1. When the terminal voltage $V_B$ of the battery 1 reaches $V_{B2}$, a field current $I_F$ of the alternator corresponding to $V_B/R_F$ flows so that the terminal voltage of the battery 1 gradually rises as a result of a DC current from the alternator. When the terminal voltage reaches $V_B = V_{B1}$, the voltage detecting transistor 17 is turned on and this turns off the field current transistors 19 and 20 with the result that the field current $I_F$ is now interrupted and the alternator stops its generation of power. Consequently, the terminal voltage of the battery 1 gradually decreases and eventually reaches $V_B = V_{B2}$ at which the field current $I_F$ starts to flow again causing the terminal voltage of the battery 1 to rise again. In this way, a sufficiently large switching hysteresis range is provided for the voltage control circuit 6 to prevent an oscillation phenomenon of field current. This results in the prevention of abnormal heat dissipation in the field current transistors 19 and 20 and at the same time reduces noise in a radio receiver installed in the vehicle and the like.

Figure 3:
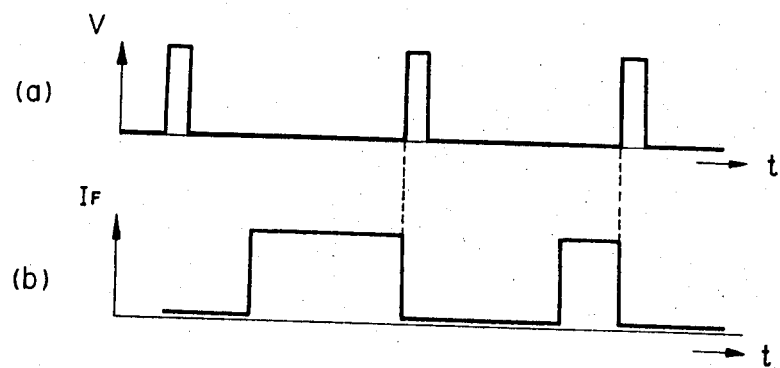
FIG. 3 is a waveform diagram showing the time relationship between the alternator field current and the oscillation period of the astable multivibrator circuit in the system of the embodiment shown in FIG. 1.

The astable multivibrator circuit 8 comprising the transistors 21 and 22 and so on consists of a conventional astable multivibrator and it produces oscillations in the conventional manner independent of the voltage control circuit 6. The switching operation of the transistor 22 in the astable multivibrator circuit 8 is reflected in the switching operation of the transistor $9a$ by the reshaping circuit 9. The collector of the transistor $9a$ is connected to the base of the input side transistor 19 of the field current transistors 19 and 20 and therefore the switching operation of the transistor $9a$ has no effect on the field current transistors 19 and 20 when they are nonconductive. However, if the transistor $9a$ conducts while the field current transistors 19 and 20 are conducting, current flows to the transistor $9a$ interrupting the base current to the field current transistors 19 and 20 and forcibly driving the transistors 19 and 20 into a nonconducting state. This operation is shown in FIG. 3 in which FIG. 3(a) shows the generated signal waveform and FIG. 3(b) shows the behavior of field current $I_F$. In other words, the field current transistors 19 and 20 are turned off in synchronism with the oscillation period of the astable multivibrator circuit 8 only when the duration of conduction of the field current transistors 19 and 20 becomes longer than the duration time of one period of the astable multivibrator circuit, and the field current transistors 19 and 20 conduct again when the terminal voltage of the battery 1 reaches $V_B = V_{B2}$. The effect of this is that by suitably selecting the oscillation period of the astable multivibrator circuit 8, for the battery voltage in the vicinity of $V_B = V_{B2}$, the duration of interruption of field current $I_F$ will not be elongated undesirably thereby preventing a variation in the luminous intensity of lights installed in the vehicle from becoming large enough to get on the nerves of the driver and cause a feeling of uneasiness on the part of the driver.

Figure 4:
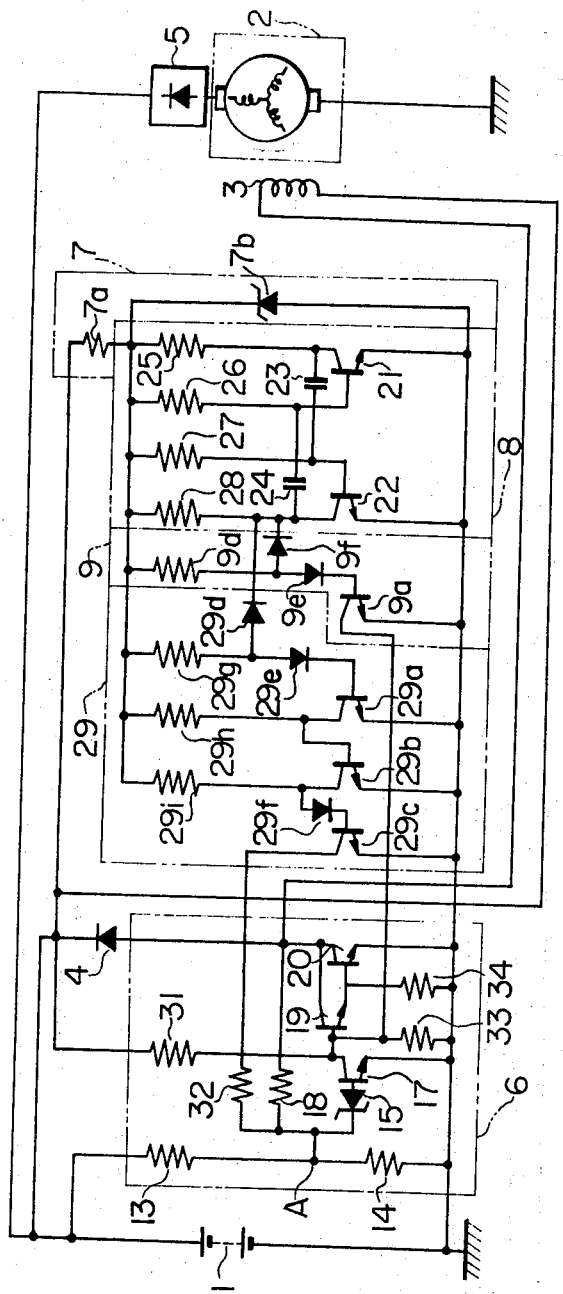
FIG. 4 is a wiring diagram of another embodiment of the system according to the present invention.

Next, the second embodiment of the present invention shown in FIG. 4 will be explained. In FIG. 4, numeral 1 designates a battery constituting the vehicle power supply, 2 the armature of an alternator, 3 the field winding of the alternator, 5 a rectifier for the alternator. Numeral 4 designates a flywheel diode for absorbing a counter electromotive force generated in the field winding 3. Numeral 7 designates a constant voltage circuit comprising a resistor 7a and a Zener diode 7b. Numeral 8 designates an astable multivibrator circuit comprising two transistors 21 and 22, two capacitors 23 and 24, and four resistors 25, 26, 27 and 28. Numeral 9 designates a reshaping circuit comprising a transistor 9a, two diodes 9b and 9c and a resistor 9d. Numeral 29 designates a delay circuit utilizing time delay due to the diode and transistor characteristics and comprising three transistors 29a, 29b and 29c, three diodes 29d, 29e and 29f, and three resistors 29g, 29h and 29i. The delay circuit 29 performs its delaying operation by means of delays due to the characteristics of the diode 29f and the transistors 29a, 29b and 29c. Numeral 6 designates a voltage control circuit comprising two biasing resistors 13 and 14, a Zener diode 15, a collector resistor 31, a voltage detecting transistor 17, a feedback resistor 18 for providing a large switching hysteresis range, transistors 19 and 20 for a field current connected to form a Darlington configuration, and three resistors 32, 33 and 34.

With the construction described above, the operation of the system of the second embodiment will now be explained. The voltage control circuit 6 is a switching circuit whose hysteresis range is adjusted to be sufficiently large for the prevention of oscillation thereof. When the terminal voltage of the battery 1 rises thus causing the voltage detecting transistor 17 to conduct, the field current transistors 19 and 20 are rendered nonconductive to interrupt the flow of field current. Consequently, the terminal voltage of the battery 1 drops causing the voltage detecting transistor 17 to become nonconductive and thereby driving the field current transistors 19 and 20 into conduction. The result is that the three-phase AC output of the armature 2 of the alternator, after full-rectification into a DC current in the rectifier 5, flows into the load circuit of the transistors 19 and 20 consisting of the field winding 3 alone, thereby ensuring a sufficiently large field current to improve the charging efficiency.

If $V_B$ denotes the terminal voltage of the battery 1, $R_{13}$, $R_{14}$, $R_{18}$ and $R_{32}$ denote the resistance values of the four resistors 13, 14, 18 and 32, $R_F$ denotes the winding resistance value of the field winding 3, $V_Z$ denotes the breakdown voltage of the Zener diode 15, $V_{BE}$ denotes the base-emitter voltage of the voltage detecting transistor 17, and $V_A$ denotes the potential at a point A, then when the transistor 29c of the delay circuit 29 is nonconducting, with the field current transistors 19 and 20 turned off by the conduction of the voltage detecting transistor 17, the potential $V_A$ at the point A must, in order to drive the nonconducting field current transistors 19 and 20 into conduction, drop below the voltage $(V_Z + V_{BE})$ required to render the voltage detecting transistor 17 nonconductive. In other words, the value of the terminal voltage $V_{B2}$ of the battery 1 for driving the field current transistors 19 and 20 into conduction is given by the following equation (3):

$$V_{B2} = [(R_{14} + R_{13} \mathbin{/\mkern-5mu/} (R_F + R_{18})/R_{14}] \cdot [(V_Z + V_{BE})] \tag{3}$$

On the other hand, the value of the terminal voltage $V_{B1}$ of the battery 1 for rendering the conducting field current transistors 19 and 20 nonconductive is given by the following equation (4):

$$V_{B1} = [(R_{13} + R_{14} \mathbin{/\mkern-5mu/} R_{18})/R_{14} \mathbin{/\mkern-5mu/} R_{18}] \cdot [(V_Z + V_{BE})] \tag{4}$$

When the transistor 29c of the delay circuit 29 is conducting, the above equations (3) and (4) also apply with the substitution of $R_{14} \mathbin{/\mkern-5mu/} R_{32}$ for $R_{14}$. In other words, the value of a terminal voltage $V_{B4}$ of the battery 1 for driving the nonconducting field current transistors 19 and 20 into conduction is given by the following equation (5):

$$V_{B4} = [(R_{14} \mathbin{/\mkern-5mu/} R_{32} + R_{13} \mathbin{/\mkern-5mu/} (R_F + R_{18})/R_{14} \mathbin{/\mkern-5mu/} R_{32}] \cdot [(V_Z + V_{BE})] \tag{5}$$

The value of a terminal voltage $V_{B3}$ of the battery 1 for rendering the conducting field current transistors 19 and 20 nonconductive is given by the following equation (6):

$$V_{B3} = [(R_{13} + R_{14} \mathbin{/\mkern-5mu/} R_{32} \mathbin{/\mkern-5mu/} R_{18})/R_{14} \mathbin{/\mkern-5mu/} R_{32} \mathbin{/\mkern-5mu/} R_{18}] \cdot [(V_Z + V_{BE})] \tag{6}$$

Figure 5:
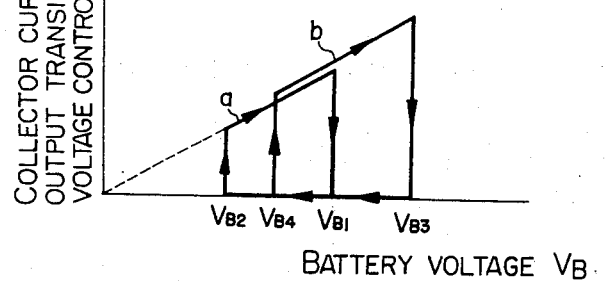
FIG. 5 is a characteristic diagram showing the switching hysteresis characteristic of the system of the embodiment shown in FIG. 4.

Accordingly, the relationship between the terminal voltage $V_B$ of the battery 1 and the collector current $I_C$ that flows into the field current transistors 19 and 20 becomes as shown in FIG. 5. The difference between the values of $V_{B1}$ and $V_{B2}$ obtained from the equations (4) and (3), respectively, represents the hysteresis range provided when the transistor 29c of the delay circuit 29 is nonconductive and it is shown by a loop $a$ in FIG. 5. On the other hand, the difference between the values of $V_{B3}$ and $V_{B4}$ obtained from the equations (6) and (5) represents the hysteresis range when the transistor 29c is conductive and it is shown by a loop $b$ in FIG. 5. In this case, there is the relationship between $V_{B1}$, $V_{B2}$, $V_{B3}$ and $V_{B4}$, respectively, as given by the following expression:

$$V_{B2} < V_{B4} < V_{B1} < V_{B3} \tag{7}$$

When the terminal voltage $V_B$ of the battery 1 reaches $V_{B2}$, the alternator field current $I_F$ corresponding to $V_B/R_F$ flows so that the terminal voltage $V_B$ of the battery 1 gradually increases due to a rectified DC current from the alternator and it eventually reaches $V_{B1}$. When this occurs, the field current transistors 19 and 20 are turned off by the conduction of the voltage detecting transistor 17, interrupting the supply of field current $I_F$ and thus causing the alternator to stop generating power. Consequently, the terminal voltage $V_B$ of the battery 1 begins to drop gradually and it eventually reaches $V_{B2}$ where the flow of field current $I_F$ occurs again. In this manner, a large switching hysteresis range is provided for the voltage control circuit 6, thereby preventing an oscillation phenomenon of field current $I_F$. This has the effect of preventing the occurrence of abnormal heat dissipation in the field current transistors 19 and 20 and suppressing noise in a radio receiver installed in the vehicle and the like.

The astable multivibrator circuit 8 comprising the transistors 21 and 22 and so on consists of a conventional astable multivibrator and it produces oscillations in the conventional manner independent of the voltage control circuit 6. The switching operation of the transistor 22 in the astable multivibrator circuit 8 is reflected in the switching operation of the reshaping transistor 9a in the reshaping circuit 9 and it is also reflected in the switching operation of the delayed waveform transistor 29c of the delay circuit 29.

In the reshaping circuit 9, the collector of the reshaping transistor 9a is connected to the base of the input side transistor 19 of the field current transistors 19 and 20. Accordingly, when the field current transistors 19 and 20 are nonconducting, the switching operation of the reshaping transistor 9a has no effect on the field current transistors 19 and 20, whereas when the field current transistors 19 and 20 are conducting, the conduction of the reshaping transistor 9a forcibly drives the field current transistors 19 and 20 into the nonconducting state.

In the delay circuit 29, the delayed waveform transistor 29c has its collector connected through the resistor 32 to the point A which is the junction point of the biasing resistors 13 and 14 in the voltage control circuit 6. Thus, the on-off operation of the delayed waveform transistor 29c causes or stops the resistor 32 forming a resistor in parallel with the biasing resistor 14, thereby moving the hysteresis loop of the voltage control circuit 8 to the higher voltage region of the battery voltage $V_B$ in FIG. 5 and thus apparently extending the whole hysteresis range.

Figure 6:
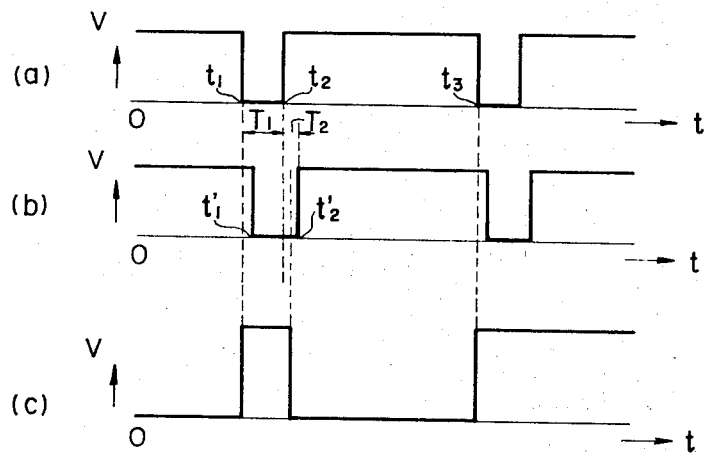
FIG. 6 is a waveform diagram showing the voltage waveforms at various portions of the system of the embodiment shown in FIG. 4.

The operation of the delay circuit 29 and the astable multivibrator circuit 8 will now be explained with reference to the waveforms shown in FIG. 6. FIG. 6(a) shows the collector potential of the reshaping transistor 9a which produces a generated signal, FIG. 6(b) shows the collector potential of the delayed waveform transistor 29c which produces a delayed waveform, and FIG. 6(c) shows the behavior of the collector potential of the output side transistor 20 of the field current transistors 19 and 20. That is, during a time $T_1$ when the reshaping transistor 9a is conducting, the field current transistors 19 and 20 are nonconducting. When the reshaping transistor 9a is cut off at a time $t_2$, the delayed waveform transistor 29c in the delay circuit 29 remains conducting during an additional delay time $T_2$ after the time $t_2$. During the time $t_1$ to $t_2$, the reshaping transistor 9a remains conductive and therefore there is no flow of field current $I_F$. Thus, the terminal voltage $V_B$ of the battery 1 gradually decreases. When, during the time $t_2$ to $t_2'$, the terminal voltage $V_B$ of the battery 1 reaches the voltage value $V_{B4}$ given by the equation (5), the field current transistors 19 and 20 conduct and the alternator starts to charge the battery 1, thereby causing the terminal voltage $V_B$ of the battery 1 to rise gradually. During the time when the terminal voltage $V_B$ is rising, the delayed waveform transistor 29c is cut off at the time $t_2'$. Before the terminal voltage $V_B$ of the battery 1 is allowed to reach the voltage value $B_{B1}$ given by the equation (4) for cutting off the field current transistors 19 and 20 in the situation above described, at a time $t_3$ the reshaping transistor 9a conducts thereby cutting off the field current transistors 19 and 20. Thereafter, the cycle of operation described above is repeated.

On the other hand, if, during a time period $t_2$ to $t_2'$, the terminal voltage $V_B$ of the battery 1 does not drop to the voltage value $V_{B4}$ given by the equation (5), the field current transistors 19 and 20 continue to stay nonconductive and thus the terminal voltage $V_B$ of the battery 1 continues to drop.

After the expiration of the time $t_2'$, the delayed waveform transistor 29c becomes nonconductive and, therefore the terminal voltage of the battery 1 required for driving the field current transistors 19 and 20 into the conducting state is changed to the voltage value $V_{B2}$ given by the equation (3). When the terminal voltage $V_B$ of the battery 1 continues to drop thereby passing through $V_{B4}$ but not reaching $V_{B2}$ as yet, the next generated signal arrives so that the instant when the time $t_2$ is reached at which the period $T_1$ of the potential waveform at the collector of the reshaping transistor 9a terminates, the characteristic of the voltage control circuit 6 has already changed to the loop b in FIG. 5 and therefore the field current transistors 19 and 20 conduct, causing the alternator to start recharging and thereby causing the terminal voltage $V_B$ of the battery 1 to gradually rise. Thereafter, the same operation as described above in which the terminal voltage $V_B$ of the battery 1 changed its direction at $V_{B4}$ is repeated.

Consequently, the terminal voltage of the battery 1 is adjusted in the vicinity of $V_B = V_{B4}$, preventing the duration of interruption of field current IF from becoming undesirably elongated and thereby preventing a variation in the luminous intensity of vehicle lights from becoming so large as to get on the nerves of the driver.

We claim:

1. A voltage regulating system for vehicle generators connected to an alternator for controlling a charging voltage of a battery, said voltage regulating system comprising: a switching circuit for detecting a battery voltage and effecting on-off control of a field current of said alternator in accordance with a plurality of set voltages, said switching circuit having a switching hysteresis characteristic; and an oscillator circuit connected to said switching circuit to continuously generate a signal voltage at a predetermined constant period, said oscillator circuit being connected to said switching circuit to interrupt the field current of said alternator at a predetermined period.

2. A voltage regulating system according to claim 1, wherein said switching circuit comprises a reference diode for detecting a power supply voltage, a first transistor circuit connected to said reference diode and adapted to become conductive and nonconductive in accordance with the conduction and nonconduction of said diode, a second transistor circuit connected to interrupt said field current upon the conduction of said first transistor circuit, and a feedback circuit connected between an input to said first transistor circuit and an output of said second transistor circuit.

3. A voltage regulating system according to claim 1, wherein said oscillator circuit comprises an astable multivibrator circuit, and a circuit for reshaping an output of said astable multivibrator circuit into a more exact rectangular waveform.

4. A voltage regulating system according to claim 2, wherein said oscillator circuit comprises an astable multivibrator circuit, a circuit for reshaping an output of said astable multivibrator circuit into a more exact rectangular waveform, and a delay circuit connected between an input terminal of said first transistor circuit and an output terminal of said astable multivibrator circuit to effect a transition from one set voltage to another of said switching circuit at the expiration of a predetermined time after the occurrence of an output signal of said astable multivibrator circuit.

* * * * *